United States Patent [19]

Scherer

[11] Patent Number: 5,060,364
[45] Date of Patent: Oct. 29, 1991

[54] WEDGE INSERTER WITH INTERMEDIATE WEDGE SUPPORT

[75] Inventor: Mark A. Scherer, Fort Wayne, Ind.

[73] Assignee: Advanced Machine & Tool Corporation, Fort Wayne, Ind.

[21] Appl. No.: 607,913

[22] Filed: Nov. 1, 1990

[51] Int. Cl.$^5$ ............................................. B23P 19/00
[52] U.S. Cl. ......................................... 29/734; 29/596
[58] Field of Search ................ 29/596, 606, 732, 734, 29/736

[56] References Cited

U.S. PATENT DOCUMENTS

| | | | |
|---|---|---|---|
| 4,276,689 | 7/1981 | Urick et al. | 29/736 |
| 4,486,947 | 12/1984 | Walker | 29/734 |
| 4,566,180 | 1/1986 | Witwer et al. | 29/734 |
| 4,829,649 | 5/1989 | Tribot | 29/734 |
| 4,955,130 | 9/1990 | Bricker et al. | 29/734 |

Primary Examiner—P. W. Echols
Attorney, Agent, or Firm—Jeffers, Hoffman & Niewyk

[57] ABSTRACT

An apparatus for inserting coils and wedges into a dynamoelectric machine stator core. The apparatus includes a housing and an array of circumferentially spaced elongated wedge guides mounted on the housing for guiding wedges during insertion thereof into a stator core. Ends of the wedge guides are disposed adjacent the stator core. A plurality of elongated blades cooperate with the wedge guide array for axial movement relative to the wedge guides. A stripper is operatively mounted within the plurality of blades for axial movement relative to the blades. A wedge support is associated with the stripper and the wedge guides for supporting wedges at points intermediate the stripper and the ends of the wedge guides. The wedge support is a disk with a cylindrical outer surface from which a plurality of fins extend radially outwardly for contacting the wedges at intermediate points between the stripper and the ends of the wedge guides.

17 Claims, 3 Drawing Sheets

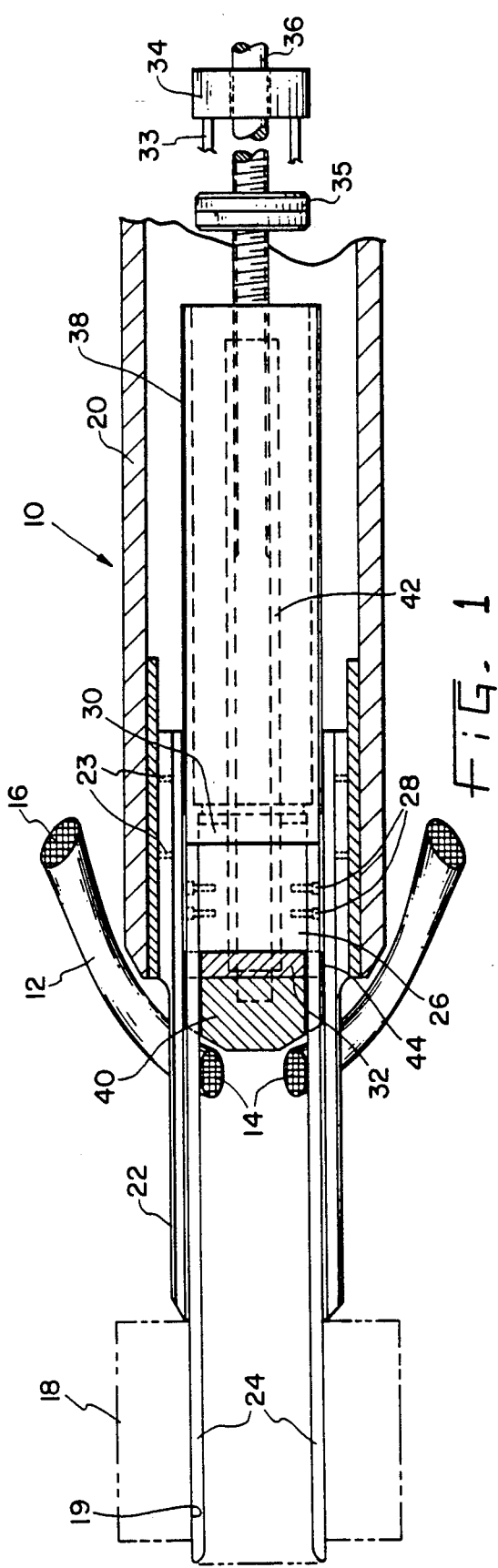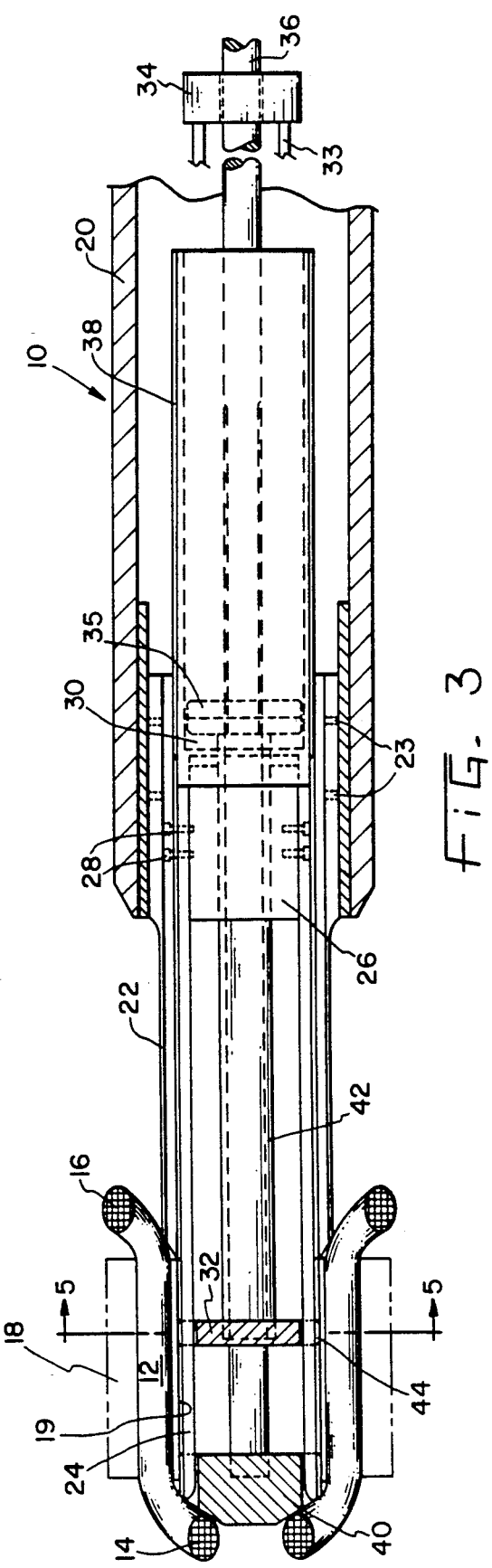

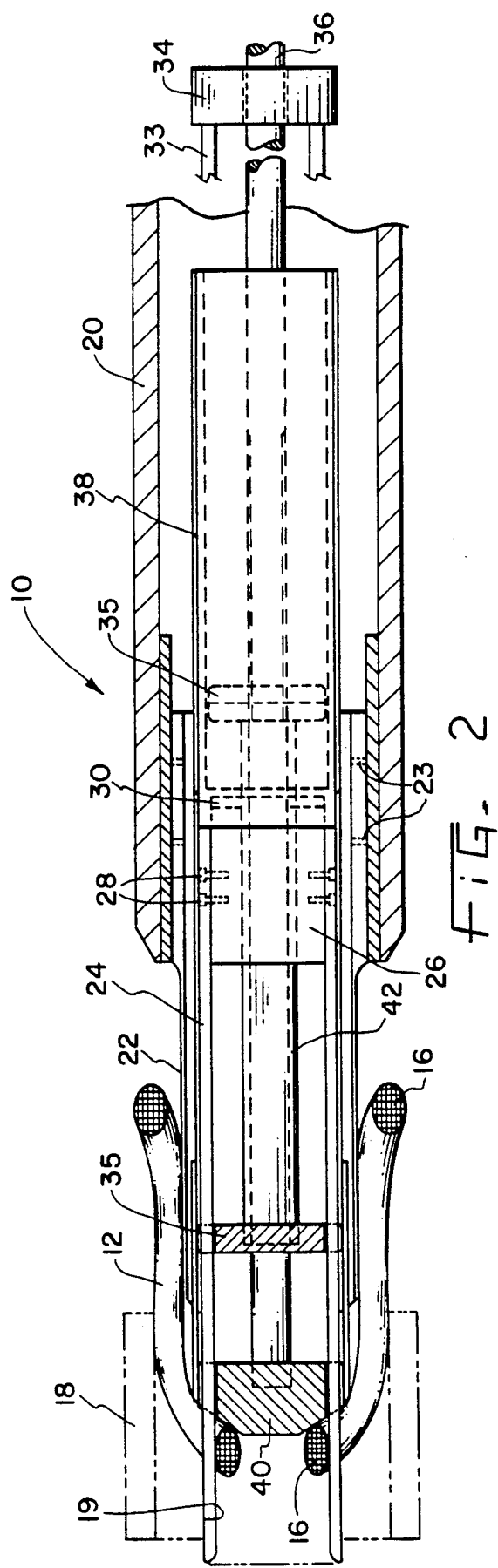

WEDGE INSERTER WITH INTERMEDIATE WEDGE SUPPORT

BACKGROUND OF THE INVENTION

This invention relates to an apparatus for inserting coils and wedges into stator cores of dynamoelectric machines. In particular, this application relates to an apparatus for insertion of coils and wedges into lengthy stator cores, namely stator cores which have a relatively large stack height to bore diameter ratio.

A number of machines have been developed for inserting pre-wound coils and wedges into stator cores. In such machines the coils are generally formed by winding machines and are placed over an array of tooling blades or fingers for subsequent insertion into a stator core. Insulating wedges may be inserted by the same equipment to separate the windings from one another or to insulate the windings from the stator core.

In such machines, the wedge guides for guiding the wedges into the stator slots are arranged in a circular array and are supported by a housing. A moveable blade pack including a stripper and an array of blades is disposed inside the wedge guide array. After the coils have been draped over the blades, the blades are inserted into the bore of a stator core for insertion of the pre-wound coils into the stator core slots by means of relative axial movement of the stripper with respect to the blade array. Immediately following insertion of the coils into the stator core, the wedges are inserted into the slots of the stator core. During such wedge insertion, the wedges are guided by the wedge guides.

In the insertion of pre-wound coils into lengthy cores, the blades will need to travel a substantial axial distance and therefore may move completely out of the wedge guide array. Since the wedge guides are generally made of fairly thin metal, when the coil end turns are pulled tight during coil insertion, the wedge guides will be deflected inwardly toward the center of the circular wedge guide array once the blades have left the wedge guide array and therefore no longer support the wedge guides. Accordingly the wedge track formed by and located between the individual wedge guides through which the wedges are pushed into the slots of the stator core will no longer align accurately with the stator slots when the wedge guides are thus deflected. The stator core iron may therefore dig into the wedges as the wedges are inserted and may even stop the wedges from further movement. Accordingly less than complete insertion of the wedges may be encountered during such wedge insertion operations. If the deflection of the wedge guides is great enough, it is even possible that the entire coil insertion process may be stopped because of jamming of the apparatus.

An additional problem that occurs in such insertion operations is that the blade pack, consisting of the blades, the stripper and the blade holder, upon its retraction back into the wedge guide array, would interfere mechanically with the deflected wedge guides, therefore potentially causing severe wear of both the wedge guides and the blades. After a sufficient number of insertion cycles, the wear of both the wedge guides and the blades may be so extensive that they need to be replaced. Such replacement is relatively expensive because of the cost of providing accurately machined wedge guides as well as insertion blades.

The wedges normally are supported at two points during their insertion into a stator core. One end of each wedge is supported by the stripper during wedge insertion and the other end of each wedge is supported by a wedge guide support which is secured to and mounted below the blade holder. However, during the insertion of long wedges into lengthy cores the column strength of the wedges is not sufficient for the forces required to insert such long wedges. Accordingly, during insertion of such long wedges, the wedges will tend to buckle and will be forced into the steel laminations of the stator core. The wedges may even be forced out of the stator slots and into the stator slot entrances, thereby causing the wedge pushrods to partially destroy the wedges. The wedges may therefore no longer provide insulation for the coil wires of the assembled stator core. It is even possible that the buckled wedges may cause interference with the insertion process and therefore cause the apparatus not to fully insert the wedges or even to jam.

Thus it is desired to provide an apparatus wherein the wedges are supported at an intermediate point between their end points, to prevent deflection of the wedges during their insertion. Furthermore, it is desired to provide such an intermediate support which is automatically adjusted together with the stripper and blades during adjustment of the apparatus for insertion of coils and wedges into stator cores of various lengths.

SUMMARY OF THE INVENTION

The present invention overcomes the disadvantages of the above described prior art insertion apparatuses by providing an improved insertion apparatus therefor.

The apparatus, according to the present invention, for inserting coils and wedges in a stator core includes an intermediate wedge support which is mounted between the stripper and the blade support and which will support the wedges intermediate their end points during insertion of the wedges into a stator core.

The present invention, in one form thereof, comprises a coil insertion apparatus including a set of elongated blades and a blade holder for attachment of the blades thereto. A stripper is operatively associated with the blades for stripping prewound coils into the slots of a stator core. A plurality of wedge guides are circumferentially spaced for guiding wedges during insertion thereof into the stator core. An intermediate wedge support comprising a circular disk with a cylindrical outer surface is mounted intermediate the stripper and blade support for supporting wedges intermediate their end points during insertion of the wedges into a stator core.

An advantage of the present invention is that it insures complete insertion of the wedges and furthermore avoids stalling of the insertion process occasioned by the prior art insertion apparatuses.

A further advantage of the present invention is that it insures that the wedges are properly inserted and therefore prevents loss of the insulative effect of the wedges after their insertion into a stator core.

The present invention, in one form thereof, comprises an apparatus for inserting coils and wedges into a dynamoelectric machine stator core. The apparatus includes a housing and an array of circumferentially spaced elongated wedge guides mounted on the housing for guiding wedges during insertion thereof into a stator core. The wedge guides have ends which are disposed closely adjacent the stator core. A plurality of elongated blades is operatively disposed within the wedge guide array for axial movement relative to the wedge guides. A stripper is operatively mounted within the plurality of blades for axial movement relative to the blades. A wedge support is operatively associated with the stripper and wedge guides for supporting wedges at points intermediate the stripper and the ends of the wedge guides during insertion of the wedges into a stator core.

The present invention, in one form thereof, comprises an apparatus for inserting coils and wedges into a dynamoelectric machine stator core. The apparatus comprises a housing and an array of circumferentially spaced, elongated wedge guides mounted on the housing for guiding elongated wedges during insertion thereof into a stator core. The wedge guides have first ends adapted to be disposed adjacent the stator core. A plurality of elongated blades is operatively disposed within the wedge guide array for axial movement relative to the wedge guides. A stripper is operatively mounted within the plurality of blades for axial movement relative to the blades. A wedge support is operatively associated with the stripper and wedge guides for supporting wedges at points intermediate the stripper and the ends of the wedge guides. The wedge support comprises a circular disk with a cylindrical outer surface and a plurality of fins extending radially outwardly from the outer surface and adapted to contact the wedges at axially intermediate points thereof.

The present invention, in one form thereof, comprises an apparatus for inserting coils and wedges into a dynamoelectric machine stator core. The apparatus comprises a housing and an array of circumferentially spaced elongated wedge guides mounted on the housing for guiding wedges during insertion thereof into the stator core. The wedge guides have their one ends adapted to be disposed adjacent to the stator core. A plurality of elongated blades is operatively disposed within the wedge guide array for axial movement relative to the wedge guides. A stripper is operatively mounted within the plurality of blades for axial movement relative to the blades. A wedge support is operatively associated with the stripper and the wedge guides for supporting wedges at points intermediate the stripper and the ends of the wedge guides during insertion of the wedges into a stator core. A wedge support tube is connected to the wedge support.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a cross-sectional elevational view of a coil and wedge insertion apparatus with the blades extending through the bore of a stator core and the coils and wedges in position to be inserted;

FIG. 2 is a cross-sectional elevational view of the apparatus of FIG. 1 with the coils and wedges partially inserted into the stator core;

FIG. 3 is a cross-sectional elevational view of the apparatus of FIG. 1 with the coils and wedges fully inserted into the stator core;

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 4:
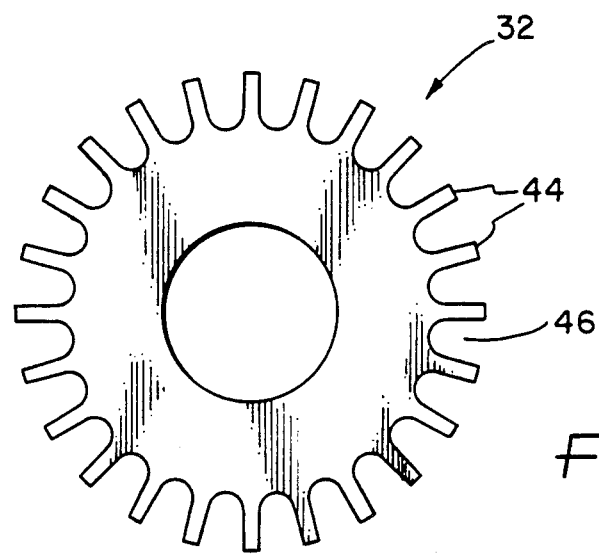
FIG. 4 is a cross-sectional view of the wedge support.

Referring now to FIG. 1, there is shown an apparatus 10 for insertion of both pre-wound coils 12 and wedges into a stator core 18. Coils 12 include end turns 14 and 16. The stator core 18 is shown as including a bore 19. A wedge guide housing 20 is shown to which a plurality of elongated wedge guides 22 are secured by fasteners as shown at 23. The spaced apart wedge guides form a circumferential array for guiding insulative wedges into the slots of stator core 18. In the disclosed embodiment the array is circular. The wedge guides 22 and housing 20 are stationary and will retain their respective axial positions with respect to stator core 18 as shown in FIG. 1 throughout the insertion process.

A plurality of elongated blades 24 are disposed within the circular confines of the circular array of wedge guides 22. The blades 24 are secured to a blade holder 26 by means of fasteners 28. Blades 24 and blade holder 26 are axially moveable relative to wedge guides 22. A bushing 30 is provided to permit rotation of blades 24 and blade holder 26 relative to a blade adjustment plate 34 for adjusting the stopping position of blade holder 26 for the desired fully extended position of blades 24 to match the stack height of a stator 18 into which coils 12 and wedges are to be inserted. This arrangement is conventional and permits the adjustment of the blades for varying stack heights of the stator laminations. A plurality of push rods 33 are secured to plate 34 and bushing 30 for driving blades 24 and blade holder 26 and for adjustment of the insertion apparatus for various lamination stack heights.

A wedge support 32 is shown for supporting the wedges at intermediate support points during the insertion process. A wedge support tube 42 is also shown for supporting and advancing wedge support 32. A stripper 40 is shown for stripping coils from blades 24 during insertion of the coils into the slots of core 18. Stripper 40 is axially moveable with respect to both the wedge guides 22 and insertion blades 24. Stripper 40 is driven by stripper rod 36 which in turn is connected to a driving mechanism (not shown).

An adjustment plate 35 is shown for adjusting the movement of wedge support tube 42 and wedge support 32 for various lamination stack heights. It should be noted that wedge support 32 "floats" relative to stripper 40 and blade holder 26, i.e. wedge support 32 can freely move in both axial directions and is not secured to stripper rod 36 or any other parts for axial movement therewith. However, plate 35 is threaded to rod 36 with ¾-20 threads whereas blade adjustment plate 34 is threaded to rod 36 by means of ¾-10 threads. Thus for every rotation of stripper rod 36 blades 24 and stripper 40 will move twice the axial adjustment distance of wedge support adjusting plate 35. Since tube 42 is driven by plate 35 and wedge support 32 is driven by tube 42 (See FIG. 2), the fully extended distance of wedge support 32 is ensured to always be approximately halfway intermediate the stripper and the ends of wedge guides 22. As shown in FIG. 1, wedge support 32 is located immediately adjacent stripper 40 because stripper 40 is at its rest position. In FIG. 1, blades 24 will have already moved through the bore of stator core 18. However, as further explained hereinafter, when the stripper is fully extended for insertion of coils into stator core 18, wedge support 32 is ensured to be located intermediate stripper 40 and the ends of wedge guides 22.

Referring further to FIG. 1, it can be seen that blades 24 engage with wedge guides 22 and support the same against radial inward movement. Wedge guides 22 each include slots 52 which form wedge tracks 53 through which wedges (not shown) are guided into the slots of stator core 18. Spaces 51 separate wedge guides 22.

Further referring to FIG. 1, a wedge guide support 38 is shown secured to blade holder 26. Wedge guide support 38 is a cylindrical tubular member. On the cylindrical outside surface of wedge guide support 38 a number of fins are provided which define wedge guide support slots. During engagement of wedge guide support 38 with wedge guides 22, the fins will slide between the wedge guides 22 and wedge guides 22 will slide in the wedge guide support slots. Thus, the wedge guides are always supported against radial inward movement, either by blades 24 or wedge guide support 38 during the insertion process.

The operation and structure of wedge guide support 38 is the subject of co-pending U.S. patent application Ser. No. 607,907 entitled "Blade Pack Extension and Wedge Guide Support" filed on even date herewith, which application is incorporated herein by reference.

Referring now to FIG. 4, the wedge support 32 is shown in cross-section. The wedge support is disk shaped with a circular outer perimeter on which fins 44 and slots 46 are defined.

Figure 5:
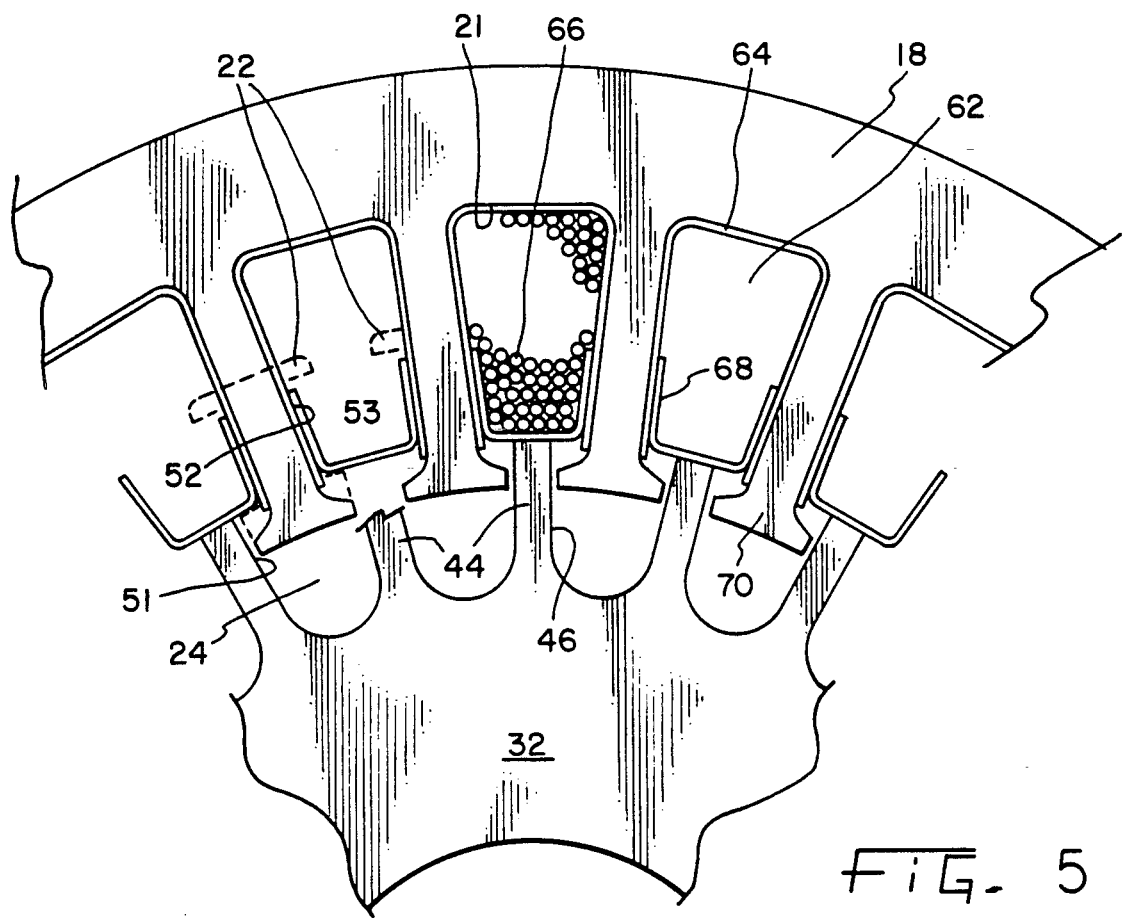
FIG. 5 is a cross-sectional view of a segment of a stator core with an inserted coil and inserted wedges.

Referring now to FIG. 5, a cross-section of a segment of stator 18 and wedge support 32 is shown. Stator slots 62 are shown to include slot liners 64 for electrically insulating the iron of stator core 18 from coil wires 66 which are shown inserted in one of the slots. Also shown are wedges 68 for both insulating wire 66 from the iron of core 18 and furthermore from preventing the wire 66 from moving out of slots 62. It can be seen that fins 44 of wedge support 32 support wedges 68 from radial inward movement. It can also be seen that blades 24 fit within the confines of slots 46 of wedge support 32. A wedge guide 22 is also shown in dashed lines. However, it should be noted that wedge guides 22 are stationary and, as seen in FIGS. 1, 2, and 3, extend only up to the lower surface of core 18 so that they will support only the end points of the wedges at the entrance into slots 21 of stator 18.

In operation, the apparatus functions as follows. Referring to FIG. 1, the apparatus 10 is first lined up with a stator core 18 so that blades 24 can be inserted through the bore 19 of stator core 18. In this position stator core 18 will rest on the ends of wedge guides 22, and blades 24 are aligned with portions 70 of stator core 18 as shown in FIG. 5. Blades 24 are furthermore aligned with and support wedge guides 22 as shown in FIG. 3. In this position, blades 24 will therefore support wedge guides 22 and will prevent their radial inward deflection despite inward forces on wedge guides 22 by the coil wire. In the configuration of FIG. 1, stripper 40 has not yet been activated, coils 12 have already been draped over both blades 24 and wedge guides 22 and extend into selected spaces 51 located between spaced apart wedge guides 22 and between spaced apart blades 24. End turns 14 are located within the confines of the circular array of blades 24. End turns 16 extend outside the circular arrays of both blades 24 and wedge guides 22. Additionally, wedge guide support 38 is in its retracted position together with the blade holder 26 to which it is attached, so that wedge guide support 38 is in contact only with the lower portions of wedge guides 22 as shown in FIG. 1. Wedge support 32 is in its retracted position immediately adjacent and below stripper 40. Wedge support adjust plate 35 was not yet contacted wedge support tube 42.

Referring now to FIG. 2, it can be seen that stripper rod 36 has been activated so that stripper 40 has moved into the bore 19 of stator core 18. At this point lead end (LE) turn 16 will have entered bore 19 of core 18 and coil wire will have begun to be inserted into the slots 62 of the stator core. At the same time wedges 68 will have begun to move into the stator core, immediately following the wire 66 of coils 12. Both the wedges 68 and the coil wire of coil 12 will move together in tandem through the stator slot 21 until both are fully inserted. It should be noted that wedge support 32 is located approximately halfway intermediate stripper 40 and blade holder 26. At this point support for wedges 68 is still provided by wedge guides 22. As seen in FIG. 5, wedge guides 22 form a wedge track 53 by means of wedge slots 52. Thus, until the wedges fully enter the slots of the stator 18, the wedge tracks 53 provide support for the wedges.

Referring now to FIG. 3, it can be seen that stripper rod 36 has been actuated so that stripper 40 has moved through the bore 19 of stator core 18 and has inserted coils 12 into the slots of stator core 18. Note that in this embodiment wherein the core 18 is not very long, blade holder 26 is still so situated that blades 24 support wedge guides 22. Also note that wedge guide support 38 has not moved relative to wedge guides 22 for the insertion of coils 12 to be completed.

For conventional stator configurations, wherein the lamination stack is less than 6 inches long, the blade pack, comprising the stripper, the blade holder, and the blades, is generally 7 inches long. Thus for these standard length configurations of stator cores, no additional radial inward support for wedge guides 22 or wedges 68 is necessary, because the blade pack will never leave the axial confines of the wedge guide array and the wedges have sufficient column strength. However, if longer lamination stacks are used, support for wedge guides 22 becomes necessary as well as for wedges 68 due to their length.

It can also be seen from FIG. 3 that wedge support 32 has moved into the bore 19 of stator 18. At this point the wedges are supported only by their end points namely by stripper 40 which has fingers which extend into slots 21 of the stator core. Similarly the wedges are supported by wedge guides 22 as shown in dotted outline in FIG. 5. However, the only support for the wedges between these two end points is provided by wedge support 32 and more specifically by fingers 44 of wedge support 32. These fingers, as shown in FIG. 5, extend into slots 21 of stator core 18 and support the wedges from inward radial deflection. On the slot side of wedges 68 the wedges are supported by wire 66. Thus the wedges are supported at three axial points by the intermediate wedge support 32.

While the stator core 18 shown in FIGS. 1, 2, and 3 is not a very long stator core, it should be appreciated that, in cases of very long stator cores, support for wedges 68 becomes even more necessary to prevent the wedges from buckling and from possible destruction as described hereinabove. Applicant has found that, by using the apparatus according to the present invention, coils and wedges can be inserted into stator cores as long as twenty-four (24) inches.

If a stator of a different length is to be manufactured in the apparatus of the present invention, stripper drive rod 36 is rotated whereby, at the same time, blades 24 will be adjusted for the proper height as well as the intermediate wedge support 32. This is by virtue of the difference in threads per inch of stripper drive rod 36. The threaded section of rod 36 which engages with adjusting plate 34 has threads which will advance plate 34 at twice the rate of the advance of wedge support adjusting plate 35. Thus it is ensured that wedge support 32 is always located halfway intermediate stripper 40 and the end of wedge guides 22 when the apparatus is fully extended.

It should also be noted that until plate 35 engages with wedge support tube 42, no leftward motion of wedge support 32 is experienced. However, when plate 35 reaches tube 42 and tube 42 contacts wedge support 32, wedge support 32 will travel leftward as described in connection with FIGS. 1, 2, and 3. On the return stroke of the apparatus, stripper 40 will cause wedge support 32 and wedge support tube 42 to retract into the positions shown in FIG. 1.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for inserting coils and wedges into a dynamoelectric machine stator core, said apparatus comprising:
   a housing;
   an array of circumferentially spaced, elongated wedge guides mounted on said housing for guiding wedges during insertion thereof into a stator core, said wedge guides having ends adapted to be disposed adjacent a stator core;
   a plurality of elongated blades operatively disposed within said wedge guide array for axial movement relative to said wedge guides;
   a stripper operatively mounted within said plurality of blades for axial movement relative to said blades, said stripper having an extended position; and
   a wedge support operatively associated with said stripper and said wedge guides for supporting elongated wedges at points intermediate the wedge ends thereof, when said points are located axially intermediate said stripper and said ends of said wedge guides and said stripper has moved to said extended position.

2. The apparatus according to claim 1 wherein said stripper is axially adjusted for inserting coils into stators of various stack heights, said wedge support being automatically axially adjustable; simultaneously with said stripper; for supporting wedges intermediate the ends thereof.

3. The apparatus according to claim 2 wherein said wedge support is adjusted an axial distance one half the axial adjustment distance of said stripper.

4. The apparatus according to claim 1 wherein said wedge support comprises a circular disc with a plurality of fins extending radially outwardly from the cylindrical outer surface of said disc.

5. The apparatus according to claim 1 including a wedge support tube means for driving said wedge support.

6. The apparatus according to claim 1 and including a wedge support tube for drivingly supporting said wedge support, an adjustable driving means adapted for drivingly contacting said tube for driving said wedge support, said driving means being adjustable for inserting wedges into stator cores of various stack heights.

7. An apparatus for inserting coils and wedges into a dynamoelectric machine stator core, said apparatus comprising:
   a housing;
   an array of circumferentially spaced, elongated wedge guides mounted on said housing for guiding wedges during insertion thereof into a stator core, said wedge guides having ends adapted to be disposed adjacent a stator core;
   a plurality of elongated blades operatively disposed within said wedge guide array for axial movement relative to said wedge guides;
   a stripper operatively mounted within said plurality of blades for axial movement relative to said blades; and a wedge support operatively associated with said stripper and said wedge guides for supporting elongated wedges at points intermediate the ends thereof when said points are located intermediate said stripper and said ends of said wedge guides, said wedge support comprising a circular disc with a cylindrical outer surface, a plurality of fins extending radially outwardly from said surface adapted to contact wedges at said intermediate points.

8. The apparatus according to claim 7 wherein said stripper is axially adjustable for inserting coils in stators of various stack heights, said wedge support being automatically axially adjustable, simultaneously with said stripper, for supporting wedges intermediate the ends thereof.

9. The apparatus according to claim 8 wherein said wedge support is adjusted an axial distance one half the axial adjustment distance of said stripper.

10. The apparatus according to claim 7 including a wedge support tube means for drivingly supporting said wedge support.

11. The apparatus according to claim 7 and including a wedge support tube for drivingly supporting said wedge support, an adjustable driving means adapted to drivingly contact said tube for driving said wedge support, said driving means being adjustable for inserting wedges into stator cores of various stack heights.

12. An apparatus for inserting coils and wedges into a dynamoelectric machine stator core, said apparatus comprising;
   a housing;
   an array of circumferentially spaced, elongated wedge guides mounted on said housing for guiding wedges during insertion thereof into a stator core, said wedge guides having ends adapted to be disposed adjacent a stator core;
   a plurality of elongated blades operatively disposed within said wedge guide array for axial movement relative to said wedge guides;
   a stripper operatively mounted within said plurality of blades for axial movement relative to said blades;

a wedge support operatively associated with said stripper and said wedge guides for supporting elongated wedges at points intermediate the ends thereof when said points are located intermediate said stripper and said ends of said wedge guides; and a wedge support tube connected to said wedge support.

13. The apparatus according to claim 12 wherein said wedge support comprises a circular disc with a plurality of fins extending radially outwardly from the cylindrical outer surface of said disc.

14. The apparatus according to claim 12 wherein said stripper is axially adjustable for inserting coils into stators of various stack heights, the wedge supporting portion of said wedge support being automatically axially adjustable, simultaneously with said stripper, for supporting wedges intermediate the wedge ends thereof during insertion of wedges into stators of various stack heights.

15. The apparatus according to claim 12 wherein said wedge support is adjusted an axial distance one half the axial adjustment distance of said stripper.

16. The apparatus according to claim 12 wherein said stripper is connected to a driving rod for driving said stripper, said driving rod disposed within said tube.

17. The apparatus according to claim 16 wherein said wedge support being floatingly received on said rod.

* * * * *